April 28, 1931.     J. J. McINTYRE     1,802,350
SHOCK ABSORBER
Filed Aug. 30, 1929
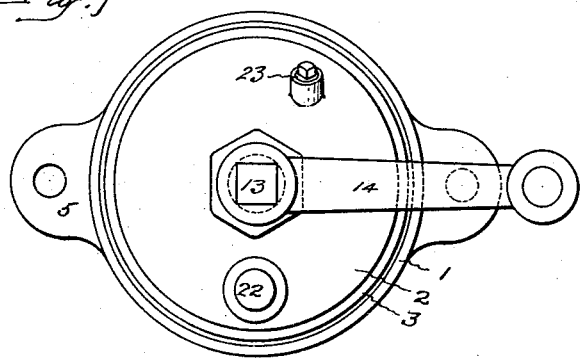
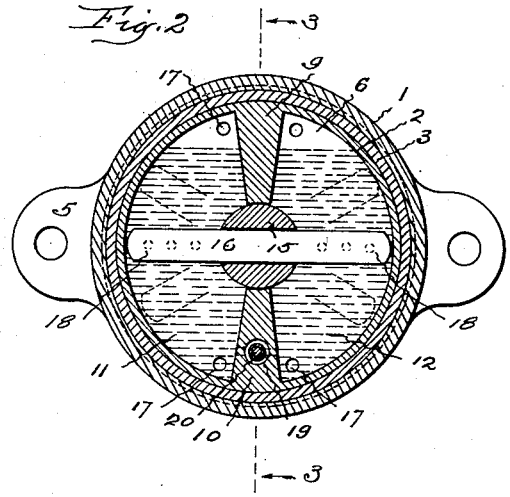   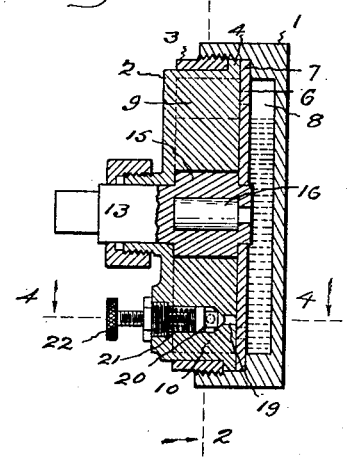
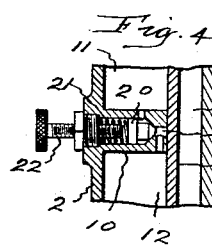
INVENTOR
John J. McIntyre
by
Harry P. Williams
atty.

Patented Apr. 28, 1931

1,802,350

UNITED STATES PATENT OFFICE

JOHN J. McINTYRE, OF HARTFORD, CONNECTICUT

SHOCK ABSORBER

Application filed August 30, 1929. Serial No. 389,343.

This invention relates to the class of semi-hydraulic oscillatory-piston type of shock absorbers for automobiles.

The object of the invention is to provide a shock absorber of this class which is cheap to manufacture and simple to apply to automobiles, and which while permitting the normal spring suspension action on smooth roads is very efficient in restraining all abnormal motion and in relieving shock incident to rough and uneven roads.

The embodiment of the invention illustrated has a cylindrical casing adapted to be attached to the frame of an automobile, which casing in the interior is divided into two chambers by fixed radially extending abutments. These chambers are partially filled with liquid and extending into each is the end of a leaf piston that is capable of independent radial movement through, but has an oscillatory movement with the hub of the shaft that projects through the casing and on the exterior has an arm adapted to be connected with the axle of the automobile. Through one of the abutments from one chamber to the other is a relief passage controlled by a valve that is adjustable from the exterior. An ante-chamber with ports to the piston chambers is provided for liquid which will compensate for loss due to leakage or evaporation and which will coact with the liquid in the piston chambers for absorbing shocks.

When the leaf piston is oscillated in either direction it not only uncovers ports from the ante-chamber and causes the opening of the passage through the abutment, but it is caused by the liquid pressure to move longitudinally so as to open a passage around one end of the piston and permit the freer flow of liquid from one side to the other, and close the passage around the other end of the piston so as to obstruct the flow of liquid from one side to the other and cause it to compress the air in the casing and thus cushion the shock of sudden action.

In the accompanying drawings Fig. 1 shows a front elevation of the shock absorber. Fig. 2 is a section on the plane indicated by the dotted line 2—2 on Fig. 3. Fig. 3 is a section on the plane indicated by the dotted line 3—3 on Fig. 2. Fig. 4 is a section on the plane indicated by the dotted line 4—4 on Fig. 3.

The casing shown consists of a cylindrical base 1 and a cylindrical cap 2 that are held together by the externally threaded ring 3 that screws into the base against a flange 4 on the cap. The base has perforated ears 5 whereby it may be fastened in place of use. A disk 6 is clamped between the inner edge of the cap and a shoulder 7 in the base so as to provide an ante-chamber 8. Extending radially inward from the inner wall of the cap are fixed abutments 9, 10, which divide the interior of the casing into two piston chambers, 11, 12.

Rotarily supported by the cap and disk is a shaft 13 on the outer end of which is fitted the arm 14 that is designed to be connected with the axle of the automobile. Loosely extending through an opening in the hub 15 of the shaft is the leaf piston 16, which is a little less in length than the internal diameter of the casing. Ports 17 are made through the disk from the piston chambers to the ante-chamber near the periphery on each side of the abutments, and ports 18 are made through the disk back of the piston. A passage 19 is made through the lower abutment from one piston chamber to the other, which passage is controlled by a valve 20 that is normally closed by a spring 21. A threaded spindle 22 is arranged to limit the amount of opening of this valve.

Liquid, such as oil or glycerine, is poured into the casing when the filling plug 23 is removed, to substantially the level indicated. When the arm is swung downward the end of the piston in the chamber 12 is turned down and the end in the chamber 11 is turned up. As this occurs a restricted amount of liquid is forced through the port 17 at the lower end of the casing into the ante-chamber, and the ports 18 back of the piston are uncovered and allow some liquid to flow from the ante-chamber into the piston chamber on the other side of the piston.

The pressure of the liquid in the lower part of the piston chamber 12 also forces the valve 20 open and allows liquid to flow through the abutment to the lower part of the piston chamber 11. When the piston movement is easy these passages permit a gentle restrained movement of the piston. If the movement of the piston is sudden or violent and the liquid in the lower part of the piston chamber is subjected to considerable pressure, that liquid tends to escape past the rounded end of the piston into the chamber above and this forces the piston lengthwise so that its other end will closely contact with the inner wall of the casing and meet the resistance of the liquid therein, which however does not offer a sudden shock as it is cushioned by the air at the top. When the movement of the operating arm is upward the actions are similar but opposite. In either case the reliefs permit an easy movement of the piston when the shocks are slight and yet they resist with a cushioning effect sudden and violent shocks.

The invention claimed is:

1. A shock absorber comprising a cylindrical base, a cylindrical cap, a threaded ring clamping together the base and cap, a disk clamped between the base and cap and closing the open end of the latter, abutments fixed to the cap and dividing the interior into separated piston chambers, a relief valve located in one abutment and controlling a passage from one piston chamber to the other, an oscillatory shaft supported by the cap and disk, and a loose piston carried by said shaft and extending into the piston chambers.

2. A shock absorber comprising a cylindrical casing with fixed abutments dividing the interior into separated piston chambers, an oscillatory shaft supported by the casing, a loose piston carried by said shaft and extending into said chambers, and an ante-chamber with ports normally closed by said piston and progressively opened by the rotatory movements of the piston, connecting the ante-chamber with the piston chambers.

3. A shock absorber comprising a cylindrical casing with fixed abutments dividing the interior into separated piston chambers, a relief valve supported in one abutment and controlling a passage from one piston chamber to the other piston chamber, an oscillatory shaft supported by the casing, a loose piston carried by said shaft and extending into said chambers, and an ante-chamber with ports normally closed by said piston and opened by the rotatory movements of the piston, connecting the ante-chamber with the piston chambers.

4. A shock absorber comprising a cylindrical casing with fixed abutments dividing the interior into separated piston chambers, a spring closed relief valve supported in one abutment and controlling a passage from one piston chamber to the other piston chamber, an oscillatory shaft supported by the casing, a piston rotatable with and movable diametrically through said shaft and extending into said chambers, and against the walls thereof, and an ante-chamber with ports connecting the ante-chamber with the piston chambers and normally closed by said piston and progressively opened by the rotatory movement of the piston.

5. A shock absorber comprising a cylindrical casing with fixed abutments dividing the interior into separated piston chambers, a spring closed relief valve located in one abutment and controlling a passage from one piston chamber to the other piston chamber, means on the exterior of the casing for limiting the amount of opening of said valve, an oscillatory shaft supported by the casing, and a piston rotatable with and diametrically movable through said shaft and extending into said chambers and against the walls thereof.

JOHN J. McINTYRE.